(12) United States Patent
Chou et al.

(10) Patent No.: US 8,486,563 B2
(45) Date of Patent: Jul. 16, 2013

(54) COMPOSITE MATERIAL FOR NEGATIVE ELECTRODE, METHOD FOR FABRICATING THE SAME AND ELECTROCHEMICAL DEVICE USING THE SAME

(75) Inventors: Kan-Sen Chou, Hsinchu (TW); Chen-Yu Kao, Hsinchu (TW); Yun-Ru Tsai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 284 days.

(21) Appl. No.: 12/910,247

(22) Filed: Oct. 22, 2010

(65) Prior Publication Data
US 2011/0236747 A1 Sep. 29, 2011

(30) Foreign Application Priority Data
Mar. 29, 2010 (TW) ................................ 99109382 A

(51) Int. Cl.
*H01M 4/52* (2010.01)
*H01M 4/62* (2006.01)

(52) U.S. Cl.
USPC .......................................... 429/221; 429/232

(58) Field of Classification Search
USPC ................................. 429/221, 232
See application file for complete search history.

(56) References Cited

U.S. PATENT DOCUMENTS

| | | | | |
|---|---|---|---|---|
| 3,597,829 A | * | 8/1971 | Wagner et al. | 429/223 X |
| 3,679,482 A | * | 7/1972 | Hardman | 429/221 |
| 3,849,198 A | * | 11/1974 | Seidel | 429/221 |
| 2005/0058907 A1 | * | 3/2005 | Kurihara et al. | 429/232 |

* cited by examiner

Primary Examiner — Stephen J. Kalafut
(74) Attorney, Agent, or Firm — Muncy, Geissler, Olds & Lowe, PLLC

(57) ABSTRACT

The present invention relates to a composite material for a negative electrode, including: a plurality of iron oxide particles; and a conductivity improver, which is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and the combination thereof. In the case of applying the composite material for a negative electrode according to the present invention in an electrochemical device, the improved charge/discharge characteristics and high capacity can be achieved. In addition, the present invention further provides a method for fabricating the above-mentioned composite material for a negative electrode and an electrochemical device using the same.

14 Claims, 2 Drawing Sheets

COMPOSITE MATERIAL FOR NEGATIVE ELECTRODE, METHOD FOR FABRICATING THE SAME AND ELECTROCHEMICAL DEVICE USING THE SAME

BACKGROUND OF THE INVENTION

1. Field of the Invention

The present invention relates to a composite material for a negative electrode, a method for fabricating the same and an electrochemical device using the same and, more particularly, to a composite material for a negative electrode suitable for a nickel-iron battery, a method for fabricating the same and an electrochemical device using the same.

2. Description of Related Art

In the aspect of growing concerns about serious environmental problems, more eco-friendly electric vehicles and hybrid electric vehicles have been developed enthusiastically. Accordingly, large-scale batteries functioning as energy sources are critical for the development of electric vehicles and hybrid electric vehicles. By reviewing the history of the batteries functioning as energy sources for electric vehicles and hybrid electric vehicles, it is known that the nickel-iron batteries were applied in transportation equipments in 1910's. They are suitably functioned as large-scale batteries due to their advantages, such as long life, tolerance of overcharge and overdischarge, abundant material sources and causing no contamination. A nickel-iron battery mainly includes: an iron electrode as a negative electrode, containing iron powders or iron oxides as main components; a nickel hydroxide electrode as a positive electrode; an alkaline electrolyte, usually being a mixed aqueous solution of potassium hydroxide and lithium hydroxide; and a separator, interposed between the negative electrode and the positive electrode.

The iron electrode using iron powders as main components are usually prepared by atomization of molten metal, electrolysis, reduction of magnetite by carbon, decomposition of $Fe(CO)_5$ or reduction of iron oxide powders by hydrogen gas. Among the above-mentioned methods, hydrogen reduction of fine iron oxide powders is more usually used to obtain porous fine iron powders. Alternatively, the technology of using $Fe_3O_4$ in an electrode has been developed. For example, the $Fe_3O_4$ active material with no treatment of hydrogen reduction can be prepared into an electrode; or ferrous oxalate is first heated up to 200° C. to remove water, then the water-free ferrous oxalate is heated up to 500° C. to perform decomposition and thereby to obtain products consisting of 15 wt. % of α-Fe and 85 wt. % of $Fe_3O_4$, and finally the products are prepared into an electrode. The capacity of such electrode is about 220 mAh/g under 40 mA/g.

However, the iron electrodes fabricated by these conventional methods have the drawback of poor capacity. Thereby, when these iron electrodes are applied in batteries as power sources, the energy density and power density of such entire batteries cannot satisfy the requirements. Accordingly, it is desirable for the present invention to improve capacity and charge/discharge characteristics of a battery.

SUMMARY OF THE INVENTION

The object of the present invention is to provide a composite material for a negative electrode, which can be fabricated in large scale by a simple and low-cost process and can achieve improved charge/discharge characteristics and high capacity while being applied in an electrochemical device.

To achieve the object, the present invention provides a composite material for a negative electrode, including: a plurality of iron oxide particles; and a conductivity improver, which is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

Accordingly, the composite material for a negative electrode according to the present invention can achieve improved charge/discharge characteristics due to the conductivity improver. In addition, an electrochemical device (such as nickel-iron batteries) applying the composite material for a negative electrode according to the present invention to a negative electrode can exhibit higher capacity.

The composite material for a negative electrode according to the present invention may further include a binder, such as polytetrafluoroethylene (PTFE), poly(vinylidene difluoride) (PVDF), styrene-butadiene-rubber and acrylic resin.

The composite material for a negative electrode according to the present invention may further include a sulfide, such as $Na_2S.9H_2O$.

In the composite material for a negative electrode according to the present invention, the iron oxide particles may be selected from the group consisting of iron (II, III) oxide ($Fe_3O_4$) particles, iron (III) oxide ($Fe_2O_3$) particles, iron (II) oxide (FeO) particles and a mixture thereof. Specifically, the iron oxide particles may be $Fe_3O_4$, $Fe_2O_3$, FeO, $Fe_3O_4$/FeO mixture, $Fe_3O_4$/$Fe_2O_3$ mixture, $Fe_3O_4$/$Fe_2O_3$/FeO mixture or FeO/$Fe_2O_3$ mixture In the composite material for a negative electrode according to the present invention, the iron oxide particles preferably range from 20 nm to 100 nm in diameter, and the weight ratio of the iron oxide particles to the conductivity preferably ranges from 0.01 to 10, more preferably from 0.1 to 10, and most preferably from 0.5 to 5.

The present invention further provides a method for fabricating a composite material for a negative electrode, including: preparing a plurality of iron oxide particles; and mixing the iron oxide particles with a conductivity improver to obtain the composite material for a negative electrode, where the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

In the method according to the present invention, the iron oxide particles may be prepared by a conventional process, such as co-precipitation. For example, iron (III) ions and iron (II) ions (the mole ratio of $Fe^{3+}:Fe^{2+}$ may be 2:1) can be mixed, followed by the addition of a precipitant (such as sodium hydroxide), and then precipitation is performed under a certain temperature and a certain pH value (such as about 12) to obtain iron oxide nanoparticles.

In the method according to the present invention, the obtained iron oxide particles preferably range from 20 nm to 100 nm in diameter, and the weight ratio of the iron oxide particles to the conductivity improver preferably ranges from 0.01 to 10, more preferably from 0.1 to 10, and most preferably from 0.5 to 5.

In the method according to the present invention, the iron oxide particles and the conductivity improver may be further mixed with a binder, such as polytetrafluoroethylene (PTFE), poly(vinylidene difluoride) (PVDF), styrene-butadiene-rubber and acrylic resin.

In the method according to the present invention, the iron oxide particles and the conductivity improver may be further mixed with a sulfide, such as $Na_2S \cdot 9H_2O$.

According to the above-mentioned method, the present invention can prepare a composite material for a negative electrode in large scale by a simple and low-cost process.

The composite material of a negative electrode according to the present invention can be used to fabricate a negative electrode and, more particularly to fabricate a negative electrode for a nickel-iron battery.

Accordingly, the present invention further provides a negative electrode, including: a negative electrode substrate; and a negative electrode coating layer coated on the negative electrode substrate, where the negative electrode coating layer includes a plurality of iron oxide particles and a conductivity improver, and the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

Also, the present invention provides a method for fabricating a negative electrode, including: preparing a plurality of iron oxide particles; mixing the iron oxide particles with a conductivity improver to obtain a composite material for a negative electrode, where the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof; and coating the composite material for a negative electrode on a negative electrode substrate to form a negative electrode coating layer.

Moreover, the present invention further provides an electrochemical device in which the above-mentioned composite material for a negative electrode in applied, including: a container; an alkaline electrolyte, received in the container; a positive electrode, interposed in the alkaline electrolyte and including a positive electrode substrate and a positive electrode coating layer coated on the positive electrode substrate, where the positive electrode coating layer includes nickel hydroxide; and a negative electrode, interposed in the alkaline electrolyte and including a negative electrode substrate and a negative electrode coating layer coated on the negative electrode substrate, where the negative electrode coating layer includes a plurality of iron oxide particles and a conductivity improver, and the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

The electrochemical device according to the present invention may further include a separator, interposed between the positive electrode and the negative electrode.

In the electrochemical device according to the present invention, each of the positive electrode substrate and the negative electrode substrate may be a conductive substrate, such ad a metal sheet or a metal net.

As mentioned above, the composite material for a negative electrode according to the present invention can be fabricated in large scale by a simple and low-cost process, and can provide improved charge/discharge characteristics and capacity to electrochemical devices, such as nickel-iron batteries. Accordingly, the composite material for a negative electrode according to the present invention has excellent market potency while being applied in the development of electric vehicles.

DETAILED DESCRIPTION OF THE PREFERRED EMBODIMENT

Example 1

Figure 1:
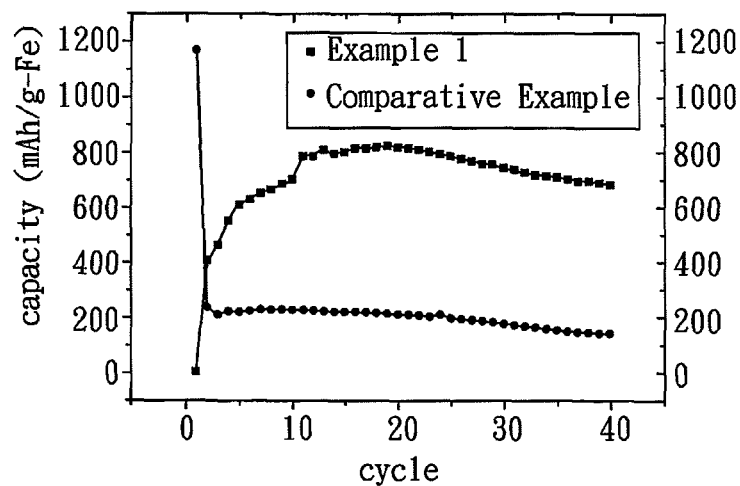
FIG. 1 shows a comparative diagram with regard to charge/discharge cycle tests of the negative electrodes according to Example 1 and Comparative Example of the present invention.

$FeSO_4 \cdot 7H_2O$ (2.3352 g) and $Fe_2(SO_4)_3 \cdot 7H_2O$ (8.94 g) are prepared into an aqueous solution, and then nitrogen gas is introduced therein for 5 minutes. Subsequently, sodium hydroxide is added therein, and the pH value of the aqueous solution is adjusted to 11-12 with continuous stirring for 30 minutes to generate about 2 g of $Fe_3O_4$. Next, $Fe_3O_4$ is separated magnetically therefrom and washed many times, followed by the addition of $CuSO_4 \cdot 5H_2O$ (1.834 g, as a conductivity improver), $Na_2S \cdot 9H_2O$ (0.09 g) and PTFE (0.22 g, as a binder), to obtain a slurry (i.e. a composite material for a negative electrode). Finally, the slurry is coated on a current collector net (i.e. a negative electrode substrate) to form a negative electrode coating layer, thus obtaining a negative electrode.

After the negative electrode prepared by the present example is charged, copper sulfate (as a conductivity improver) in the negative electrode will be reduced into nano copper and surround reduced iron microparticles from the reduction of $Fe_3O_4$ during charging.

In the present example, the diameter of the iron oxide particles (i.e. $Fe_3O_4$ particles) is in a range of from about 20 nm to about 100 nm, and the weight ratio of the iron oxide particles (i.e. $Fe_3O_4$ particles) to the conductivity improver (i.e. $CuSO_4 \cdot 5H_2O$) is about 1.

Example 2

$FeSO_4 \cdot 7H_2O$ (2.3352 g) and $Fe_2(SO_4)_3 \cdot 7H_2O$ (8.94 g) are prepared into an aqueous solution, and then nitrogen gas is introduced therein for 5 minutes. Subsequently, sodium hydroxide is added therein, and the pH value of the aqueous solution is adjusted to about 12 with continuous stirring for 30 minutes to generate about 2 g of $Fe_3O_4$. Next, $Fe_3O_4$ is separated magnetically therefrom and washed many times, followed by the addition of Cu (0.467 g, as a conductivity improver), $Na_2S.9H_2O$ (0.09 g) and PTFE (0.22 g, as a binder), to obtain a slurry (i.e. a composite material for a negative electrode). Finally, the slurry is coated on a current collector net (i.e. a negative electrode substrate) to form a negative electrode coating layer, thus obtaining a negative electrode.

In the present example, the diameter of the iron oxide particles (i.e. $Fe_3O_4$ particles) is a range of from about 20 nm to about 100 nm, and the weight ratio of the iron oxide particles (i.e. $Fe_3O_4$ particles) to the conductivity improver (i.e. nano copper) is about 4.

Example 3

$FeSO_4.7H_2O$ (2.3352 g) and $Fe_2(SO_4)_3.7H_2O$ (8.94 g) are prepared into an aqueous solution, and then nitrogen gas is introduced therein for 5 minutes. Subsequently, sodium hydroxide is added therein, and the pH value of the aqueous solution is adjusted to about 12 with continuous stirring for 30 minutes to generate about 2 g of $Fe_3O_4$. Next, $CuSO_4.5H_2O$ (1.834 g) is added therein, and the pH value of the aqueous solution is adjusted to about 12, thereby generating $Cu(OH)_2$ from $CuSO_4.5H_2O$. Then, powders of $Cu(OH)_2$ and $Fe_3O_4$ mixed uniformly are collected by suction filtration, followed by baking. Subsequently, the baked powders are mixed uniformly with $Na_2S.9H_2O$ (0.09 g) and PTFE (0.22 g, as a binder) to obtain a slurry (i.e. a composite material for a negative electrode). Finally, the slurry is coated on a current collector net (i.e. a negative electrode substrate) to form a negative electrode coating layer, thus obtaining a negative electrode.

After the negative electrode prepared by the present example is charged, copper hydroxide (as a conductivity improver) in the negative electrode will be reduced into nano copper and surround reduced iron microparticles from the reduction of $Fe_3O_4$ during charging.

In the present example, the diameter of the iron oxide particles (i.e. $Fe_3O_4$ particles) is in a range of from about 20 nm to about 100 nm, and the weight ratio of the iron oxide particles (i.e. $Fe_3O_4$ particles) to the conductivity improver (i.e. $Cu(OH)_2$) is about 3.

Comparative Example $NaBH_4$ (0.1 mole) is dissolved into pure water (100 ml) as a reducing agent, and then the reducing agent is gradually added into a solution (50 ml) containing $FeSO_4.7H_2O$ (0.025 mole) under ice bath to perform reduction reaction, followed by washing many times with pure water. Subsequently, the prepared pure iron microparticles are separated magnetically therefrom and mixed with $Na_2S.9H_2O$ (0.09 g) and PTFE (0.22 g, as a binder) to obtain a slurry. Finally, the slurry is coated on a current collector net to form a negative electrode coating layer, thus obtaining a negative electrode.

Experimental Example

Charging/Discharging Cycle Test

Figure 2:
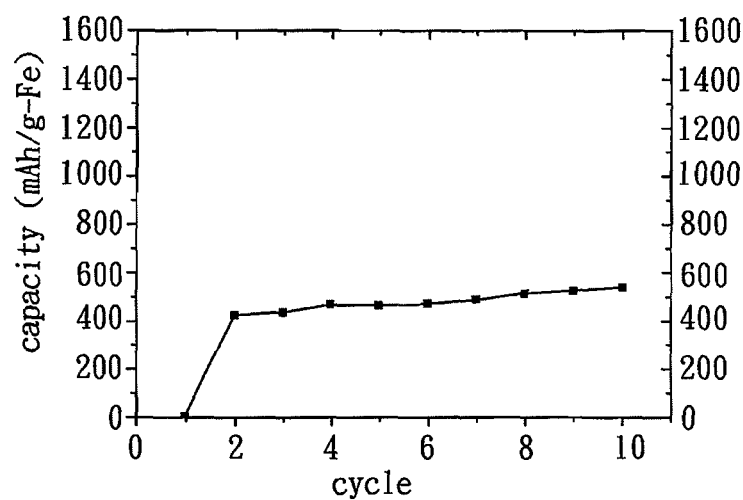
FIG. 2 shows a diagram with regard to a charge/discharge cycle test of the negative electrode according to Example 2 of the present invention.
Figure 3:
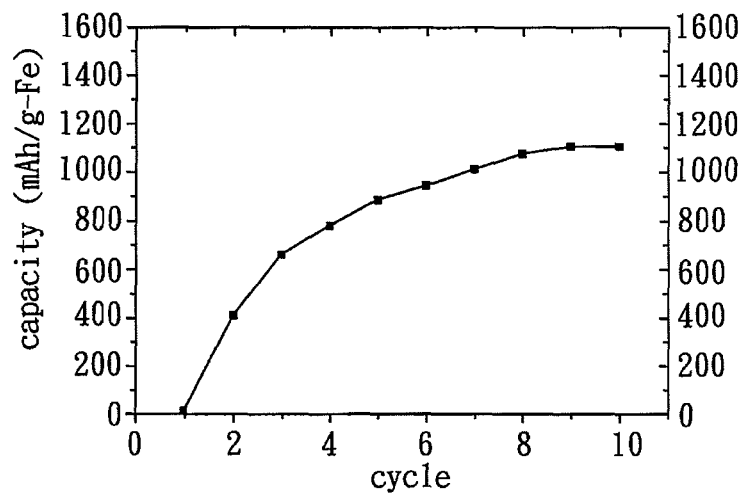
FIG. 3 shows a diagram with regard to a charge/discharge cycle test of the negative electrode according to Example 3 of the present invention.

Commercial $Ni(OH)_2$ is prepared into a positive electrode. Subsequently, the negative electrodes prepared by Examples 1 to 3 and the positive electrode are interposed into an electrolyte (1 M of LiOH and 4 M of KOH). Under 200 mA/g-Fe current, the charge/discharge cycle tests are carried out, and the results are shown in FIGS. 1 to 3. From FIG. 1, it can be found that the composite material for a negative electrode according to Example 1 of the present invention exhibits better capacity, about 700 mAh/g-Fe, in comparison with the capacity (about 200 mAh/g-Fe) of the conventional pure iron microparticles (Comparative Example). In addition, the measured capacity values of the composite materials according to Examples 2 and 3 of the present invention are 500 mAh/g-Fe and 1100 mAh/g-Fe, respectively, higher than the capacity of the conventional pure iron microparticles, as shown in FIGS. 2 and 3.

Example 4

Figure 4:
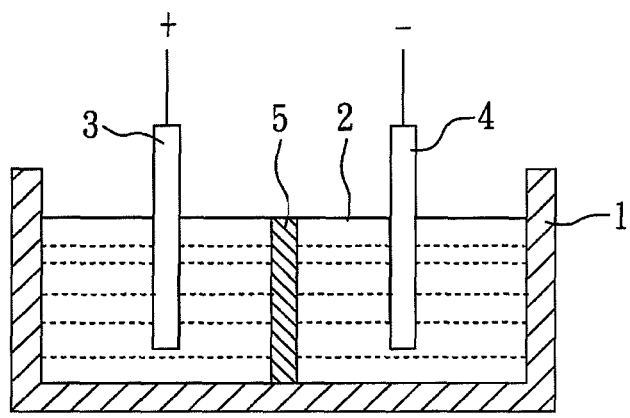
FIG. 4 shows a schematic view of an electrochemical device according to a preferred example of the present invention.

FIG. 4 shows a schematic view of an electrochemical device according to a preferred example of the present invention, including: a container 1; an alkaline electrolyte 2, received in the container 1; a positive electrode 3, interposed in the alkaline electrolyte 2 and including a positive electrode substrate and a positive electrode coating layer coated on the positive electrode substrate, where the positive electrode coating layer includes nickel hydroxide; a negative electrode 4, interposed in the alkaline electrolyte 2 and including a negative electrode substrate and a negative electrode coating layer coated on the negative electrode substrate, where the negative electrode coating layer includes a plurality of iron oxide particles and a conductivity improver, and the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof; and a separator 5, interposed between the positive electrode 3 and the negative electrode 4. Herein, the diameter of the iron oxide particles (i.e. $Fe_3O_4$ particles) is in a range of from about 20 nm to about 100 nm, and the weight ratio of the iron oxide particles to the conductivity improver is in a range of from about 0.01 to about 10.

Although the present invention has been explained in relation to its preferred embodiment, it is to be understood that many other possible modifications and variations can be made without departing from the scope of the invention as hereinafter claimed.

What is claimed is:
1. A composite material for a negative electrode, comprising:
    a plurality of iron oxide particles;
    a sulfide; and
    a conductivity improver, which is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

2. The composite material for a negative electrode as claimed in claim 1, wherein the iron oxide particles range from 20 nm to 100 nm in diameter.

3. The composite material for a negative electrode as claimed in claim 1, the weight ratio of the iron oxide particles to the conductivity improver ranges from 0.01 to 10.

4. The composite material for a negative electrode as claimed in claim 1, further comprising a binder.

5. A method for fabricating a composite material for a negative electrode, comprising:
preparing a plurality of iron oxide particles; and
mixing the iron oxide particles with a conductivity improver and a sulfide to obtain the composite material for a negative electrode, wherein the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

6. The method as claimed in claim 5, wherein the iron oxide particles range from 20 nm to 100 nm in diameter.

7. The method as claimed in claim 5, wherein the weight ratio of the iron oxide particles to the conductivity improver ranges from 0.01 to 10.

8. The method as claimed in claim 5, wherein the iron oxide particles are prepared by co-precipitation of at least two types of iron oxide particles.

9. The method as claimed in claim 5, wherein the iron oxide particles, the conductivity improver and the sulfide are further mixed with a binder to obtain the composite material for a negative electrode.

10. An electrochemical device, comprising:
a container;
an alkaline electrolyte, received in the container;
a positive electrode, interposed in the alkaline electrolyte and comprising a positive electrode substrate and a positive electrode coating layer coated on the positive electrode substrate, wherein the positive electrode coating layer comprises nickel hydroxide; and
a negative electrode, interposed in the alkaline electrolyte and comprising a negative electrode substrate and a negative electrode coating layer coated on the negative electrode substrate, wherein the negative electrode coating layer comprises a plurality of iron oxide particles, a sulfide and a conductivity improver, and the conductivity improver is selected form the group consisting of copper, cobalt, nickel, tin, antimony, bismuth, indium, silver, gold, lead, cadmium, carbon black, graphite, copper salt, cobalt salt, nickel salt, tin salt, antimony salt, bismuth salt, indium salt, silver salt, gold salt, lead salt, cadmium salt, copper hydroxide, cobalt hydroxide, nickel hydroxide, stannic hydroxide, antimony hydroxide, bismuth hydroxide, indium hydroxide, silver hydroxide, gold hydroxide, lead hydroxide, cadmium hydroxide and a combination thereof.

11. The electrochemical device as claimed in claim 10, further comprising a separator, interposed between the positive electrode and the negative electrode.

12. The electrochemical device as claimed in claim 10, wherein the iron oxide particles range from 20 nm to 100 nm in diameter.

13. The electrochemical device as claimed in claim 10, wherein the weight ratio of the iron oxide particles to the conductivity improver ranges from 0.01 to 10.

14. The electrochemical device as claimed in claim 10, wherein the negative electrode coating layer further comprises a binder.

* * * * *